US006453327B1

(12) United States Patent
Nielsen

(10) Patent No.: US 6,453,327 B1
(45) Date of Patent: Sep. 17, 2002

(54) METHOD AND APPARATUS FOR IDENTIFYING AND DISCARDING JUNK ELECTRONIC MAIL

(75) Inventor: Jakob Nielsen, Atherton, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 08/661,686

(22) Filed: Jun. 10, 1996

(51) Int. Cl.$^7$ .............................................. G06F 17/21
(52) U.S. Cl. ...................... 707/500; 709/206; 345/752
(58) Field of Search .......................... 707/500, 1, 9; 709/206; 345/752

(56) References Cited

U.S. PATENT DOCUMENTS

| | | | | |
|---|---|---|---|---|
| 5,057,935 A | * | 10/1991 | Williams ..................... | 358/402 |
| 5,093,918 A | * | 3/1992 | Heyen et al. .......... | 395/200.45 |
| 5,109,519 A | * | 4/1992 | Zimmet et al. ........ | 395/200.36 |
| 5,113,393 A | * | 5/1992 | Kam et al. .................. | 370/389 |
| 5,125,075 A | * | 6/1992 | Goodale et al. ....... | 395/200.36 |
| 5,283,856 A | * | 2/1994 | Gross et al. ................ | 706/47 |
| 5,377,354 A | * | 12/1994 | Scannell et al. ........... | 395/673 |
| 5,555,346 A | * | 9/1996 | Gross et al. ................ | 706/45 |
| 5,619,648 A | * | 4/1997 | Canale et al. ......... | 395/200.36 |
| 5,627,764 A | * | 5/1997 | Schutzman et al. .... | 395/200.37 |
| 5,632,018 A | * | 5/1997 | Otorii ..................... | 395/200.3 |
| 5,634,005 A | * | 5/1997 | Matsuo ................. | 395/200.36 |
| 5,724,567 A | * | 3/1998 | Rose et al. ................... | 707/2 |
| 5,765,033 A | * | 6/1998 | Miloslavsky .......... | 395/200.36 |
| 5,765,178 A | * | 6/1998 | Tanaka ....................... | 707/526 |
| 5,802,253 A | * | 9/1998 | Gross et al. ................. | 706/45 |

FOREIGN PATENT DOCUMENTS

EP           0 375 138 A2      6/1990

OTHER PUBLICATIONS

Staff, Making Connections to the Net, Midrange Systems, v.8,n.2.p.21, Jan. 27, 1995.*
Johnson, Info Hypeway: A Worst Case Scenario, Electronic Engineering Times, n.863,p.26, Aug. 28, 1995.*
Stephen Pollock, "A Rule–Based Message Filtering System", ACM Transactions on Office Information Systems, vol. 6, No. 3, Jul. 1, 1988, pp. 232–254, XP 000564860.
Standard For The Format Of ARPA Internet Text, revised by David H. Crocker, Department of Electrical Engineering, University of Delaware, Newark, DE 19711, RFC#822, Aug. 13, 1982, pp. i–47.
Is RSA patented?, by Vespa Savikko, Apr. 5, 1995, pp. 1–4, http://dmlwww.cs.tut.fi/RSAfaq/node28.html.

* cited by examiner

Primary Examiner—Joseph H. Feild
(74) Attorney, Agent, or Firm—McDermott, Will & Emery

(57) ABSTRACT

Apparatus, methods, systems and computer program products are disclosed to provide electronic mail systems with the capability for a group of trusted users to collectively determine whether a given electronic mail message is junk e-mail. Further, if the given electronic mail message is determined to be junk mail, the e-mail systems of other trusted users in the group dispose of unviewed copies of the junk e-mail. Thus, the invention reduces the exposure of junk e-mail messages to the group of trusted users.

36 Claims, 15 Drawing Sheets

METHOD AND APPARATUS FOR IDENTIFYING AND DISCARDING JUNK ELECTRONIC MAIL

BACKGROUND OF THE INVENTION

1. Field of the Invention

This invention relates to the field of Electronic Mail Management Systems. Specifically, this invention is a new and useful method, apparatus and computer program product for ignoring junk electronic mail (e-mail) messages.

2. Background

Electronic mail provides a quick and convenient way for computer users to communicate. A message originator initiates this communication by composing a message using a text editing program, providing the e-mail address of the intended recipient, and often by providing an indication of the content (subject matter) of the message by including text in a "subject" field. Then, using well-understood technology, the originator's mail system sends the message to the recipient's computer address. The recipient's computer receives the message and stores it in the recipient's inbox. The recipient eventually reads, deletes, responds to, or otherwise processes the message stored within the inbox by using any of a number of e-mail programs well known in the art.

Because these messages travel across networks, they generally are constructed according to the *Standard for the Format of ARPA Internet Text Messages* specification (RFC822). This specification can be found on the world wide web of the Internet at address "http://www.cis.ohio-state.edu/htbin/rfc/rfc822.html". Messages formatted to the RFC822 standard have a header portion and an optional body portion that contains the text of the message. The header portion includes a number of fields that address and classify the message. The invention does not require the use of the RFC822 standard. So long as there exists a method to identify essential information the invention is applicable. However, the embodiment described herein uses the RFC822 protocol.

The header portion of a message contains fields composed of character strings comprising a field-name followed by a colon, followed by a field-body terminated by a carriage return/line feed. An example header field is:

"To: John Doe<CR><LF>".

In this example, the <CR> represents the ASCII carriage return character and the <LF>represents the ASCII line feed character. The header field-names are not case sensitive, thus, "to:" is equivalent to "TO: ", "To:" or "to:".

The originator, who composes the message, specifies the contents of many header fields. The "To: " field contains the addresses of the intended primary recipients of the message where the address of each recipient is separated by a comma. The "Cc:" field contains the addresses of the intended secondary recipients of the message (again each address is separated by a comma). The "Subject:" field often provides a summary, or indicates the nature, of the message. Although the originator initializes all these fields as desired, the contents of the recipient fields are generally required to be actual Internet addresses. On the other hand, the Subject: field has no specific meaning and may, in fact, be blank or contain a random arrangement of characters. Generally, the Subject: field generally contains a short title representative of the message's subject matter.

The mail system also adds header fields to the message. One of these fields is the Message-ID: field. The field-body of this field contains a unique machine readable identifier that uniquely identifies each message.

An originator can address a single message to many recipients by separating the addresses of the recipients with a comma. Each of these recipients may respond to the original message by sending a reply message to the same list of recipients (plus the originator). Some of these recipients may then respond to the first reply message. These reply messages are termed follow-up messages to the original message. This process facilitates a vigorous discussion between the originator and the recipients, as well as between the recipients.

As mentioned above, most Electronic Mail programs provide a mechanism so that the recipient can reply to a message. This mechanism generally allows the reply to be sent to the original originator, or to be sent to all of the original recipients in addition to the originator. These e-mail programs use the same "Subject:" field-body text as the original message but generally prepend an indicator to the field-text portion of the subject header to indicate that the reply message relates to the subject matter of the original message. That is, that the reply message is continuing the discussion initiated by the original message. The modification to the subject field is generally made by prepending one of the following strings to the subject field-body text: "Re:", "RE:", "re:", "ReN:", "reN:", "REN:", "Re [N] :","re [N]:", or "RE [N]:" (where "N" is an integer). Thus, the recipients of the reply to the original message can determine that the reply is directed to an ongoing discussion and not initiating a new discussion. Hence, a discussion evolves between the recipients relating to the subject matter of the original message.

This process has expanded into the distribution list concept. A distribution list is generally directed towards a particular subject matter (for example, the copyright list "cni-copyright@cni.org"). Thus, those who are interested in the subject matter "subscribe" to the distribution list. Subscribers have their e-mail address added to the list of recipients for messages sent from the distribution list. Thus, when the distribution list receives a message it redistributes the message, using normal e-mail, to all the subscribers (recipients) of the distribution list. Distribution lists can be managed directly by some human agency, a program (a listserver), or a combination of both. Some distribution lists are moderated in the sense that a human reviews all incoming messages prior to reposting them through the distribution list. Other distribution lists are not moderated. Thus, messages received by the unmoderated group are automatically redistributed to the rest of the subscribers without human review.

With e-mail discussions, particularly with unmoderated discussion lists, a recipient often loses interest in following a discussion about any given subject matter. When that recipient would rather not read the message it becomes electronic junk mail—a waste of time to open, read, and discard. Because it takes the recipient's time to discard these messages, they rapidly accumulate and soon dominate the recipient's inbox. Another source of junk e-mail is from people who send messages to a large number of recipients most of whom have no interest in the message. Yet another source of junk e-mail is from people who spam the net. Spamming occurs when someone sends a message to several distribution lists dedicated to topics that are unrelated or only marginally related to the content of the spamming message. Recipients may even receive multiple copies of the spamming message from different distribution lists. Spam has been described as "an obnoxious, netwide epidemic" and has even engendered a lawsuit by an annoyed recipient (see "http://techweb.cmp.com/net/issues/036issue/

036law.htm"). Still another source of junk mail results from recipients of distribution list messages who mistakenly send subscribe and unsubscribe messages directly to the distribution list instead of to the listserver serving the distribution list. This results in the subscribe and unsubscribe messages being redistributed to the recipients of the distribution list instead of being processed by the listserver.

Everyone desires to be rid of junk e-mail, but not everyone agrees on what junk e-mail is. A facility that removes junk e-mail is subject to being abused by those who desire to censor e-mail or desire to maliciously delete e-mail addressed to another. One prior art method used to limit the transmission of junk e-mail is to use a moderated distribution list as described above. However, this approach delays the distribution of e-mail because a human moderator must review each message before the message is distributed to the list. Further, the moderator has the sole discretion to decide which messages are distributed. Thus, discussions on topics disagreeable to the moderator are difficult because the moderator may censor the discussion and thereby limit the effectiveness of the discussion group. Finally, spammers may simply send spam messages to a multiple set of individual e-mail addresses instead of sending these messages through distribution lists.

The prior art partially addresses this problem by enabling the creation of recipient modifiable "filters" that ignore e-mail messages that the recipient does not desire to view. These filters examine each message for some condition. If the filter detects that condition in the message, the filter performs an operation on that message. These filter operations generally include a delete operation. Thus, uninteresting messages can be removed from incoming e-mail without intervention by the recipient. However, messages that have already been stored in the recipient's inbox are generally not accessible to a filter. Thus, most filters will not remove unread messages in the recipient's inbox. Further, even those filters that can remove messages from the recipient's inbox require the recipient to execute some additional command to do so. Another problem with filters is that they are notoriously difficult for non-programmers to use and often require significant debugging. Additionally, at some later date the recipient must remember to deactivate the filter to be able to read future interesting discussions that nevertheless satisfy the conditions being filtered. Finally, one problem with the filter approach to removing junk e-mail is that junk e-mail usually does not have a consistent characteristic that the filter can detect. This means that the recipient must constantly create new narrowly tailored filters specialized for each type of junk e-mail message. However, even with narrowly tailored filters some messages that the recipient would not consider to be junk e-mail may fall within the parameters of the filter and be deleted.

The invention addresses these problems and simplifies a recipient's use of e-mail by providing a mechanism for identifying and automatically deleting most junk e-mail messages without the disadvantages and problems of the prior art solutions.

SUMMARY OF THE INVENTION

The present invention overcomes the disadvantages of the above described systems and provides an economical, apparatus, method, system and computer program product for providing enhanced facilities to users of electronic mail systems. One aspect of the invention is a computer controlled method for processing electronic mail. The method presents an e-mail message to a trusted recipient who classifies the e-mail message. If the trusted recipient classifies the e-mail message as being junk e-mail, the method prevents the presentation of the junk e-mail to other trusted users who have not yet viewed the junk e-mail.

In another aspect of the invention, an electronic mail system is disclosed using a central processing unit (CPU), a memory, and a filestorage mechanism to provide a presentation mechanism that presents an electronic mail message to a trusted recipient belonging to a group of trusted recipients. This aspect of the invention also provides a classification mechanism that allows the trusted recipient to classify the e-mail message. Further, this aspect of the invention discloses a presentation prevention mechanism that operates to prevent the e-mail message from being presented to one or more trusted recipients.

In yet another aspect of the invention an electronic mail apparatus is disclosed using a central processing unit (CPU), a memory, and a filestorage mechanism for preventing the presentation of an e-mail message to one or more trusted recipients.

Another aspect of the invention is a computer program product having computer readable code embodied in a computer usable storage medium. This code, when executed on a computer, processes electronic mail messages and causes the computer to effect a presentation prevention mechanism that prevents presentation of an e-mail message to one or more trusted recipients.

Another aspect of the invention is a trusted group server apparatus that uses a central processing unit (CPU), a memory, and a filestorage mechanism. This apparatus includes a notification reception mechanism that receives junk mail report messages and a warning mechanism that sends junk mail warning messages to the trusted recipients served by the trusted group server apparatus.

Yet a final aspect of the invention is a computer program product having computer readable code embodied in a computer usable storage medium. This code, when executed on a computer, causes a computer to provide services to a trusted recipient. These code devices are configured cause a computer to receive junk mail report messages and to send junk mail warning messages to a trusted group recipient.

Description of the Drawings

The objects, features and advantages of the system of the present invention will be apparent from the following description in which.

NOTATIONS AND NOMENCLATURE

Figure 1:
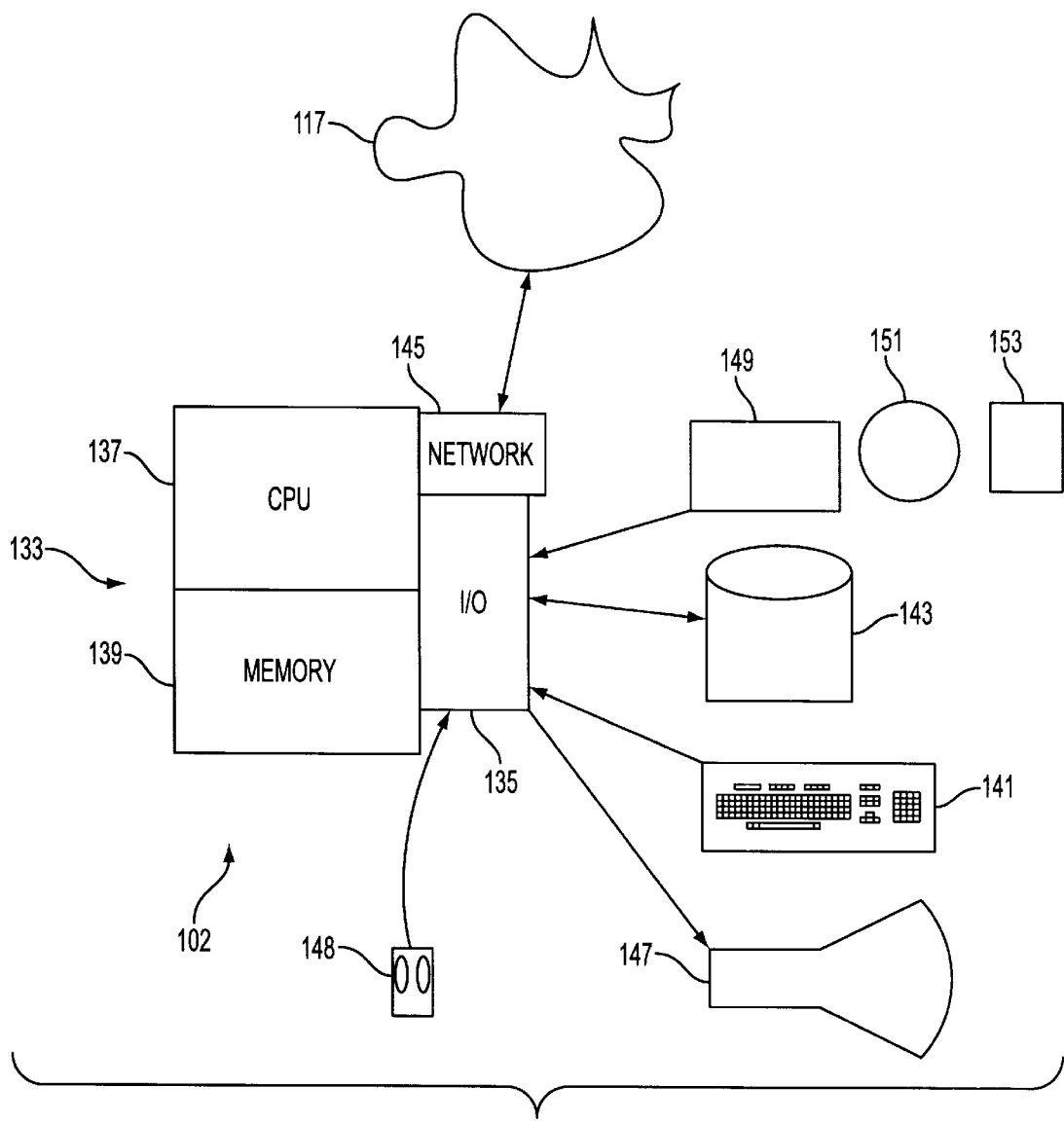
FIG. 1 illustrates a portion of a computer, including a CPU and a conventional memory in which the present invention may be embodied.

Distribution list—An e-mail recipient that receives e-mail and forwards that e-mail to subscribers to the distribution list. A computer application called a listserver often manages a distribution list. A distribution list is often termed a mailing list.

E-mail system—An electronic mail system being a system of computers generally connected by a network that allow an originator (being a user of a first computer) to compose and send data making up a message to a recipient (being a user of either the first computer or of a second computer).

Graphical User Interface (GUI)—A user interface that allows a user to interact with a computer display by pointing at selectable control areas on the display and activating a command or computer operation associated with the selectable control area. GUIs are well known in the art.

Inbox—an area on a filestorage used by an e-mail system to store e-mail messages that have not been viewed by a recipient.

Originator—A computer user or computer application program that composes an e-mail message and presents the message to the computer's e-mail system for transmission to one or more recipients.

Pane—An area in a window where an application may draw graphics (i.e., text, pictures, movies, etc.).

Pointing device—A device that is responsive to a computer user's input that moves an indicator on a computer display screen. Such an indicator has an active point such that if the pointing device is activated (for example, by a button push for a mouse device) a command associated with the selectable control area covered by the active point is invoked. Graphical User Interfaces generally use pointing devices.

Recipient—A computer user or computer application program having an e-mail address where an originator can send an e-mail message.

Text String—Ordered computer data in a computer that represents text. One common representation of a text string is a sequence of eight bit bytes each containing an ASCII representation of a character. Such a sequence is often terminated by a byte whose value is zero or by having a leading value indicate the length of the string. One skilled in the art will understand that there exist many methods for storing text strings beyond the ones mentioned here.

Spamming—The act of sending an e-mail message to multiple distribution lists in such a way that the message does not fit into the distribution lists' particular subject matter or posting the same or nearly identical message too many times to the same distribution list or set of recipients.

Selectable control area—An area on a computer display that is sensitive to activation of a pointing device. Activation of the pointing device over the selectable control area invokes a command or computer operation associated with the selectable control area. Most computer systems that provide a Graphical User Interface (GUI) also provide other methods for invoking these commands or computer operations such as keyboard function keys or command lines.

User—A human who uses a computer.

Window—an area, usually rectangular, on a computer display screen controlled by an application.

A procedure is a self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols characters, terms, numbers, or the like. It will be understood by those skilled in the art that all of these and similar terms are associated with the appropriate physical quantities and are merely convenient labels applied to these quantities.

The manipulations performed by a computer in executing opcodes are often referred to in terms, such as adding or comparing, that are commonly associated with mental operations performed by a human operator. No such capability of a human operator is necessary in any of the operations described herein that form part of the present invention; the operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

Finally, the invention may be embodied in a computer readable storage medium encoded with an e-mail application program.

Description of the Preferred Embodiments

Overview

The invention allows a subset of the members of a trusted group of recipients to determine which e-mail messages should be considered to be junk e-mail for the rest of the members of the trusted group. A trusted group of recipients is composed of those who have some common approach or interest. An example of a trusted group is one made up of company employees. Another example is the group of professionals who subscribe to a distribution list of interest to their profession. Once an e-mail message is displayed to some number of trusted recipients and a sufficient number of those recipients classify that message as junk e-mail, other trusted recipients who have not yet viewed the offending e-mail message are saved the annoyance of viewing the message because it is automatically removed from their mail system. Thus, the trusted group, as a whole, is benefited by the actions of the first recipients who view and classify the message as junk e-mail.

Operating Environment

Some of the elements of a computer system 102 configured to support an e-mailsystem is shown in FIG. 1 wherein a processor 133 is shown, having an Input/Output ("I/O") section 135, a central processing unit ("CPU") 137 and a memory section 139. The I/O section 135 is connected to a keyboard 141, a disk storage unit 143, a network interface 145 to provide access to a network 117, a display unit 147, a pointing device 148 and a CD-ROM drive unit 149. The CD-ROM unit 149 can read a CD-ROM storage medium 151 that typically contains programs 153 and data. The CD-ROM 149 and the disk storage unit 143 comprise a filestorage mechanism. One skilled in the art will understand that the filestorage mechanism may comprise read only memory, RAM or other storage technology that allows a computer to access data. Such a computer system is capable of executing e-mail applications that embody the invention.

Figure 2:
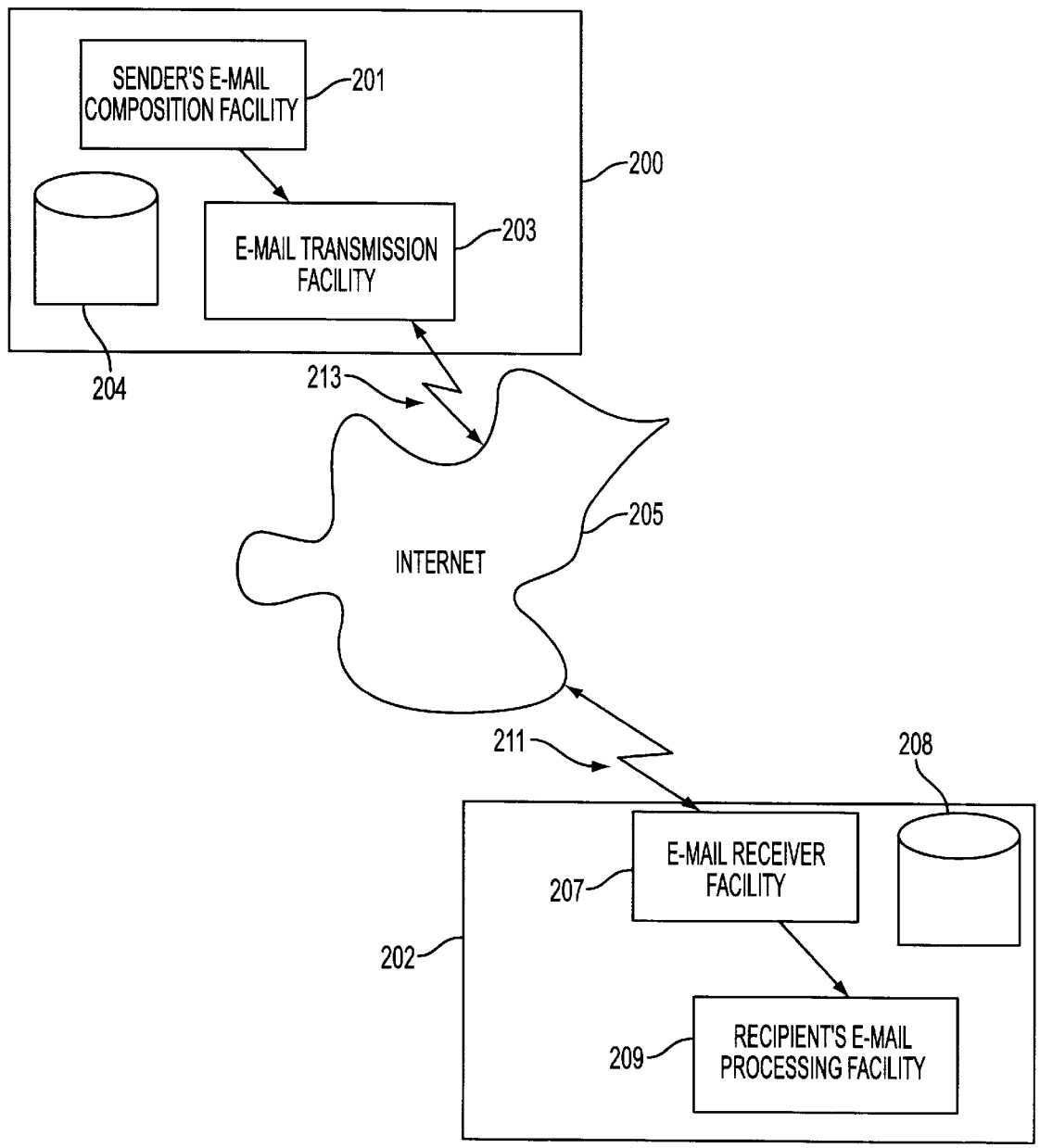
FIG. 2 illustrates the overall structure of an electronic mail system.

FIG. 2 provides a conceptual overview of the elements of an electronic mail system. An originator's e-mail system 200 contains a composition facility 201 that allows the originator to compose an e-mail message including specifying a subject and a recipient's e-mail address. This e-mail message is passed to the e-mail transmission facility 203 where it is sent to the intended recipient's address. Often the message is sent to the recipient by using the Internet 205 as indicated by the arrow labeled as 213. If the intended recipient is on the same computer as the originator the e-mail message generally does not cross the Internet 205. Optionally, a copy of the message is stored in the originator's filestorage 204. The recipient's e-mail system 202 contains a facility to receive e-mail 207 and to store the e-mail message in the recipient's inbox. E-mail messages arriving from the Internet 205 enter the e-mail receiver system 207 as indicated by the arrow labeled as 211. The inbox is generally maintained in a filestorage 208. The recipient reads and processes e-mail messages in the recipient's inbox by using any of a number of application programs that comprise the recipient's e-mail processing system 209.

Operational Overview

Figure 3:
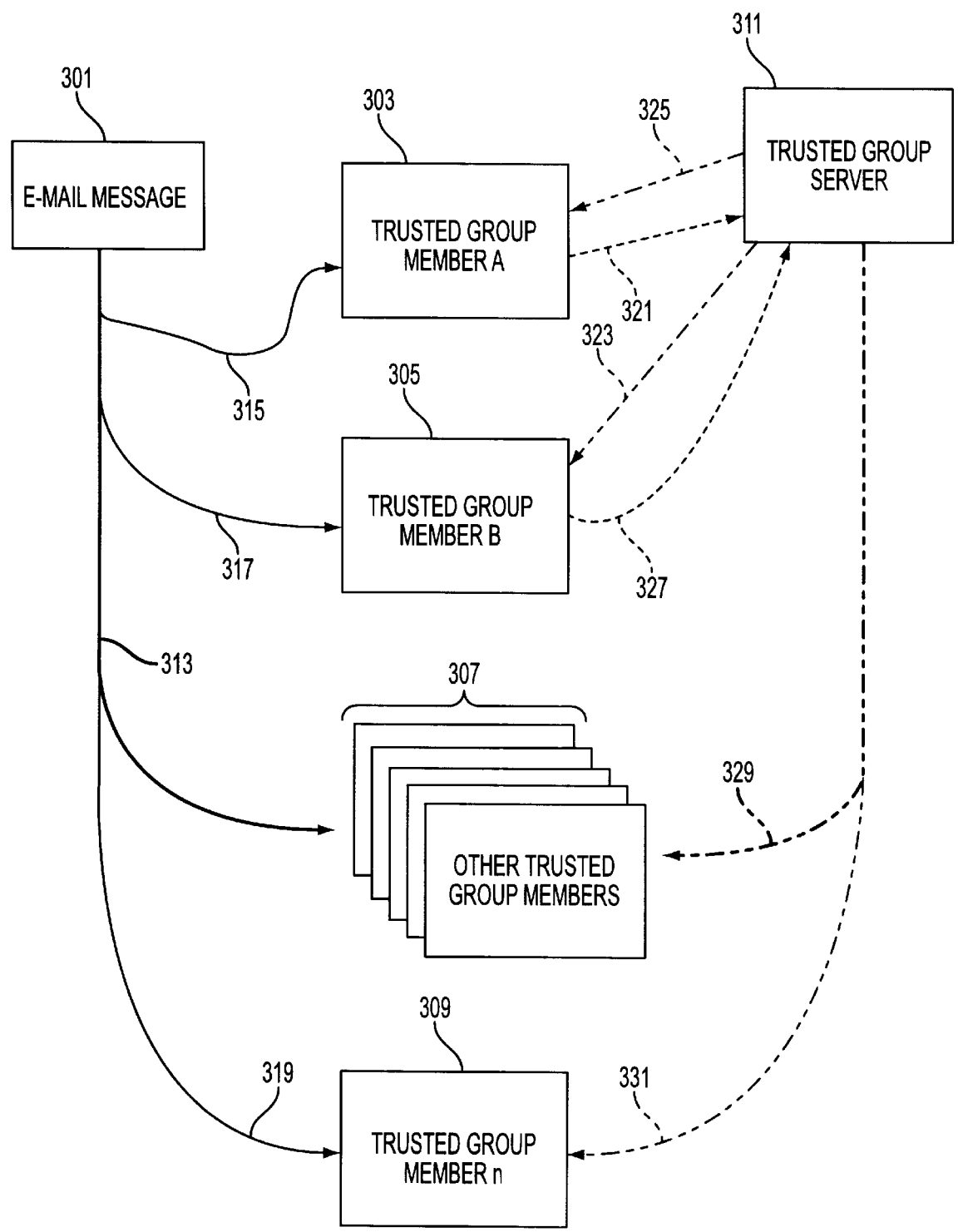
FIG. 3 is an overview of the operation of the invention in accordance with a preferred embodiment.

FIG. 3 illustrates the operation of the invention. An originator sends a putative junk e-mail message 301 that is delivered to many recipients as indicated by the arrows labeled as 313, 315, 317, and 319. Some of these recipients are members of a trusted group served by a Trusted Group Server 311. In this example, the putative junk e-mail message 301 is received by Trusted Group Members A, B and "n" 303, 305, 309 and possibly by some, but not necessarily all, other Trusted Group Members 307. Further, assume that Trusted Group Members A and B 303, 305 receive the putative junk e-mail message 301 before Trusted Group Member "n" 309 receives the putative junk e-mail message. Trusted Group Members A and B 303, 305 both use their respective e-mail systems to present the putative junk e-mail message 301 for each to view and separately classify the putative junk message 301 as being junk e-mail. This classification results in an e-mail message, containing an X-Junk-Mail-Report: header, being sent to the Trusted Group Server 311, as indicated by the dashed arrows labeled as 321 and 327, for each trusted user who so classifies the putative junk e-mail. If the Trusted Group Server 311 receives a sufficient number of Junk Mail Report messages identifying the putative junk message 301 the Trusted Group Server 311 will distribute an e-mail message containing an X-Junk-Mail-Warning: header to the Trusted Group Members 303, 305, 307, 309 as indicated by the arrows labeled as 323, 325, 329, and 331. Upon receipt of the Junk Mail Warning message, the e-mail system for each Trusted Group Member removes the putative junk message 301 if it has been received but not yet read by the intended recipient. Further, if the putative junk message 301 has not been received, the invention conditions the intended recipient's e-mail system to discard the putative junk message 301 if it does arrive. Thus, if a sufficient number of trusted users determine that the putative junk message 301 should be classified as junk e-mail the other Trusted Group Members will not be annoyed by the putative junk message 301 because it will be automatically deleted from their e-mail systems.

Figure 4A:
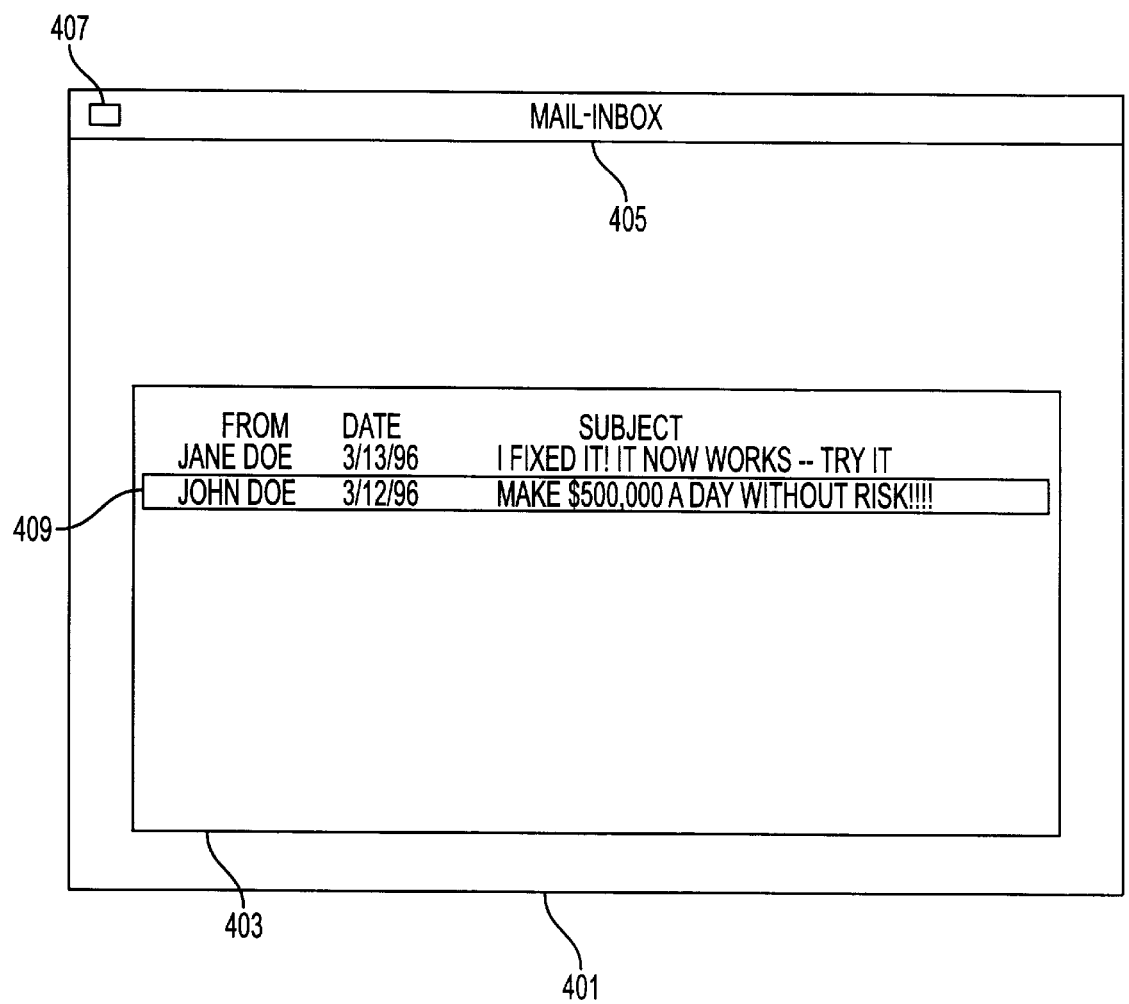
FIGS. 4a&b illustrate user displays presented by an application program configured in accordance with a preferred embodiment.

FIG. 4a illustrates an example display presented to an e-mail recipient when using a typical e-mail system to examine messages stored in an inbox. The e-mail system presents the window 401 on the display device. The window 401 has a title bar 405 that includes a close box selectable control area 407. The recipient can manipulate a pointing device to move the cursor's active area over the close box 407 and activate the pointing device (typically by clicking a button on the pointing device). This activation sends a command to the application controlling the window 401 to cause the application to close the window 401 and possibly terminate execution of the application. The window 401 includes a scrolling pane 403 that contains information about the e-mail messages in the recipient's inbox. The message labeled as 409 is currently selected. The content of this e-mail message is displayed in FIG. 4b.

Figure 4B:
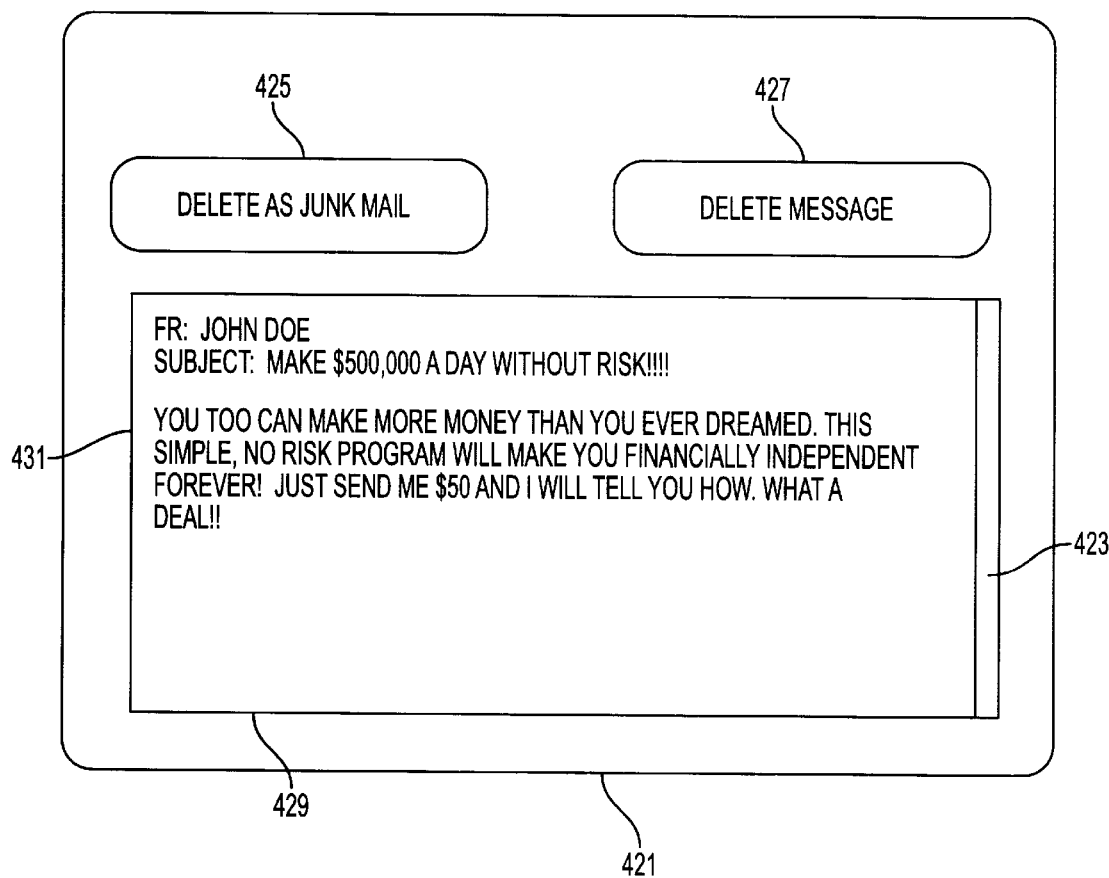

FIG. 4b illustrates a window 421 displayed by an e-mail viewing program. A pane 429 within the window 421 contains the text 431 of the selected message 409. The pane 429 includes a scroll control selectable control area 423 that allows the recipient to scroll the message text 431 if the pane 429 is too small to display the message text 431 in its entirety. The recipient activates the "Delete Message" selectable control area 427 to cause the e-mail system to delete the displayed message. Clearly this particular message 409 will often be considered junk e-mail. The "Delete as Junk Mail" selectable control area 425 allows the recipient to both delete the message 409 and to inform the trusted groups to which the recipient belongs that the recipient considered the message 409 to be junk e-mail.

Database Information

A preferred embodiment of the invention maintains information regarding Trusted Group Servers, Trusted Group Members, putative junk e-mail and junk e-mail.

Figure 5:
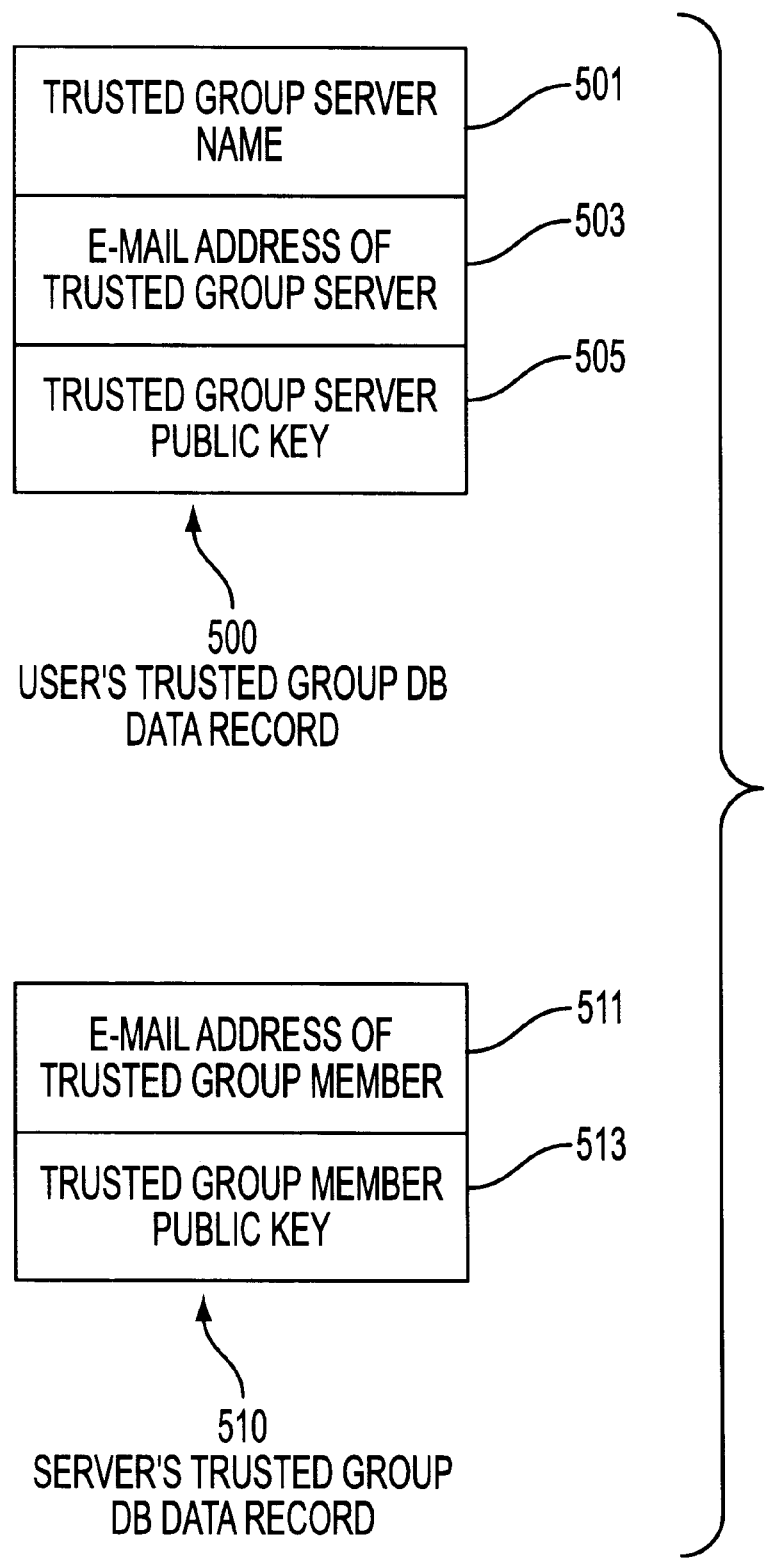
FIG. 5 illustrates the data structures used to maintain Trusted Group Member information in accordance with a preferred embodiment.

FIG. 5 illustrates the databases maintained in the trusted user's client computer and in the trusted group's server computer relating to trusted groups. The e-mail system on the user's computer maintains the User's Trusted Group database. The user may belong to a number of trusted groups. The "Trusted Group Server Name" field 501 of the record 500 is associated (either contains, or refers directly or indirectly) with a text string that represents the name of one of these trusted groups. The "E-mail Address of Trusted Group Server" field 503 is associated with a text string that is an e-mail address of an application program recipient that effectuates the functionality of the Trusted Group Server. The "Trusted Group Server Public Key" field 505 is associated with the public encryption key provided for the server. By using prior art methods, as described below, the Trusted Group Server's public key, when used with the user's public key allows the Trusted Group Server to authenticate that a message it received was sent from a trusted user of the group.

The Trusted Group Server maintains the Server's Trusted Group database. Each record 510 in this database comprises a "E-mail Address of a Trusted Group Member" field 511, and a "Trusted Group Member Public Key" field 513. The "E-mail Address of a Trusted Group Member" field 511 is associated with a text string that is the e-mail address of the Trusted Group Member. The "Trusted Group Member Public Key" field 513 contains the public encryption key provided for the user.

Figure 6:
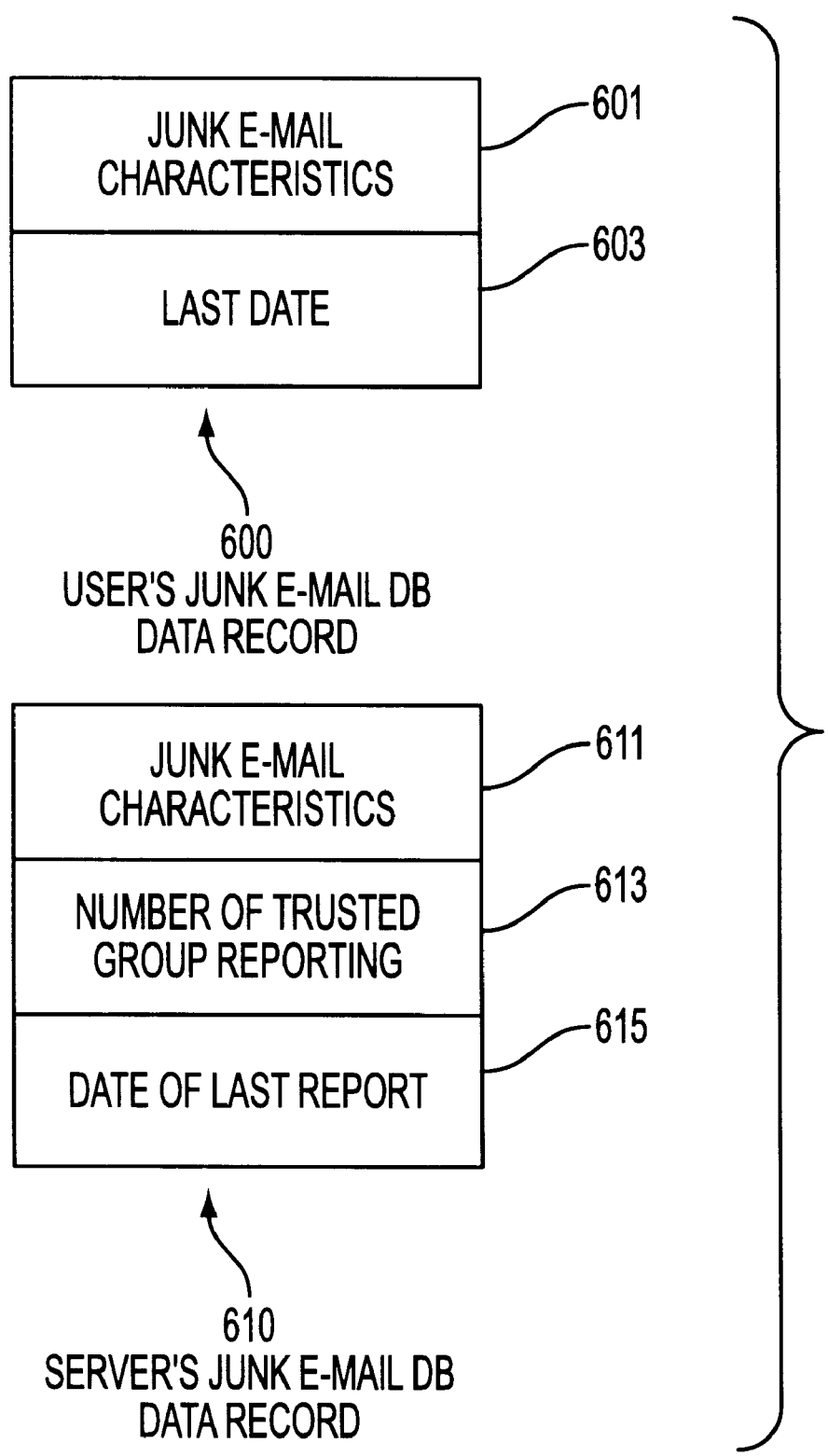
FIG. 6 illustrates the data structures used to maintain junk e-mail characteristics of in accordance with a preferred embodiment.

FIG. 6 illustrates the databases maintained in the trusted user's client computer and in the trusted group's server computer relating to junk e-mail. The e-mail facilities for each trusted user maintain a database of information about junk e-mail. Each record 600 in the User's Junk E-mail database contains a "Junk E-mail Characteristics" field 601 and a "Last Date" field 603. The contents of the "Junk E-mail Characteristics" field 601 is associated with a set of text strings. The attributes of the set of text strings associated with this field 601 are described below. The "Last Date" field 603 contains data that represents the calendar date when the record 600 was last used or updated.

The Trusted Group Server also maintains a database of information relating to putative and junk e-mail. Each record 610, in the Server's Junk E-mail database has a "Junk E-mail Characteristics" field 611, having attributes similar to those of the corresponding field 601 in the User's Junk E-mail database. These attributes are described below. The record 610 also includes the "Number of Trusted Group Reporting" field 613 that maintains a count of the number of Trusted Group Members who have classified the putative junk e-mail message associated with the "Junk E-mail Characteristics" field 611 as being junk e-mail. Finally, the "Date of Last Report" field 615 contains data that represents the calendar date of the last report received. Once the value of the "Number of Trusted Group Reporting" field reaches or exceeds a specified value the putative junk e-mail is considered to be junk e-mail.

Database Maintenance

Figure 7:
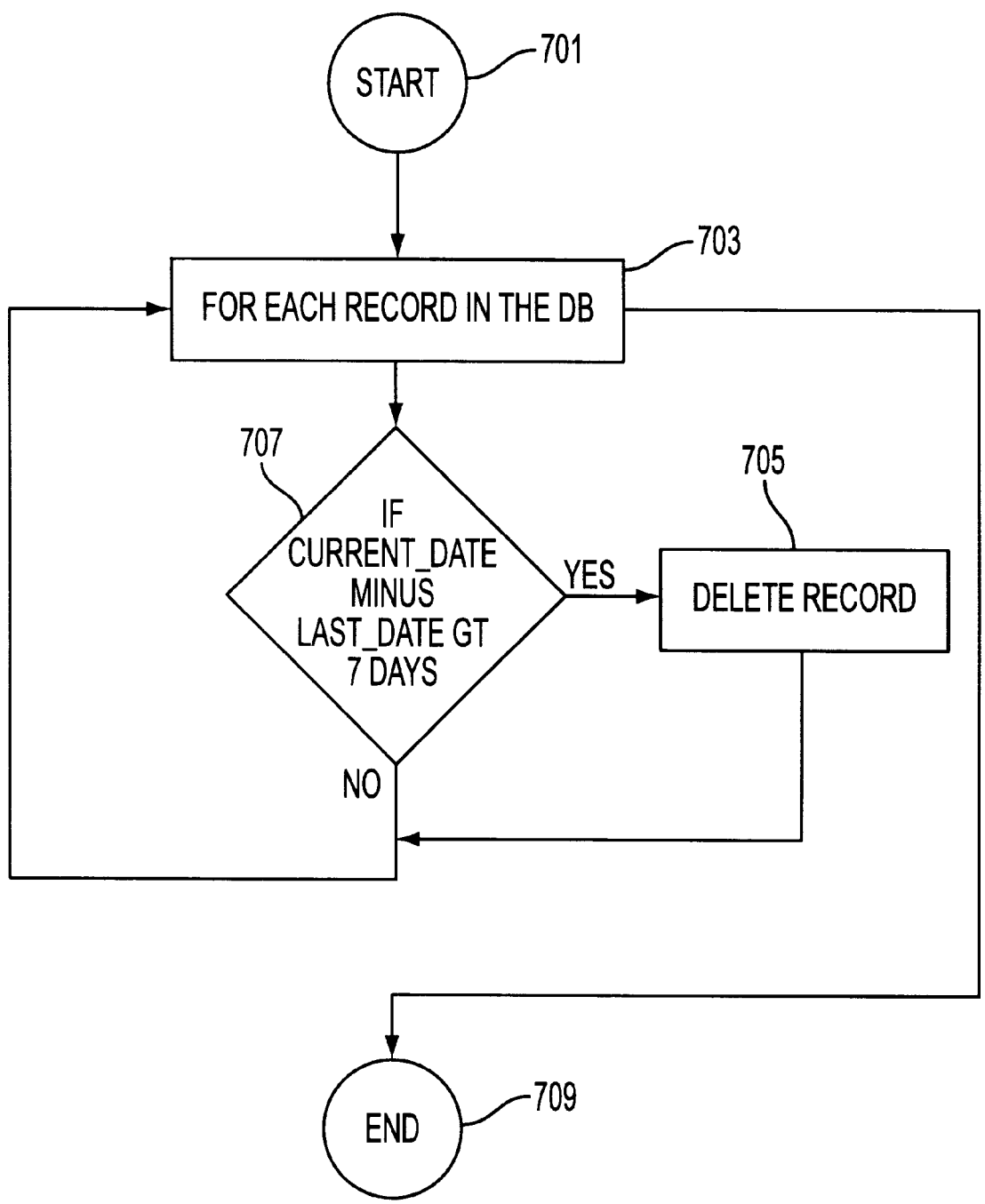
FIGS. 7&8 illustrate the processes used to clean the junk e-mail databases in accordance with a preferred embodiment.
Figure 8:
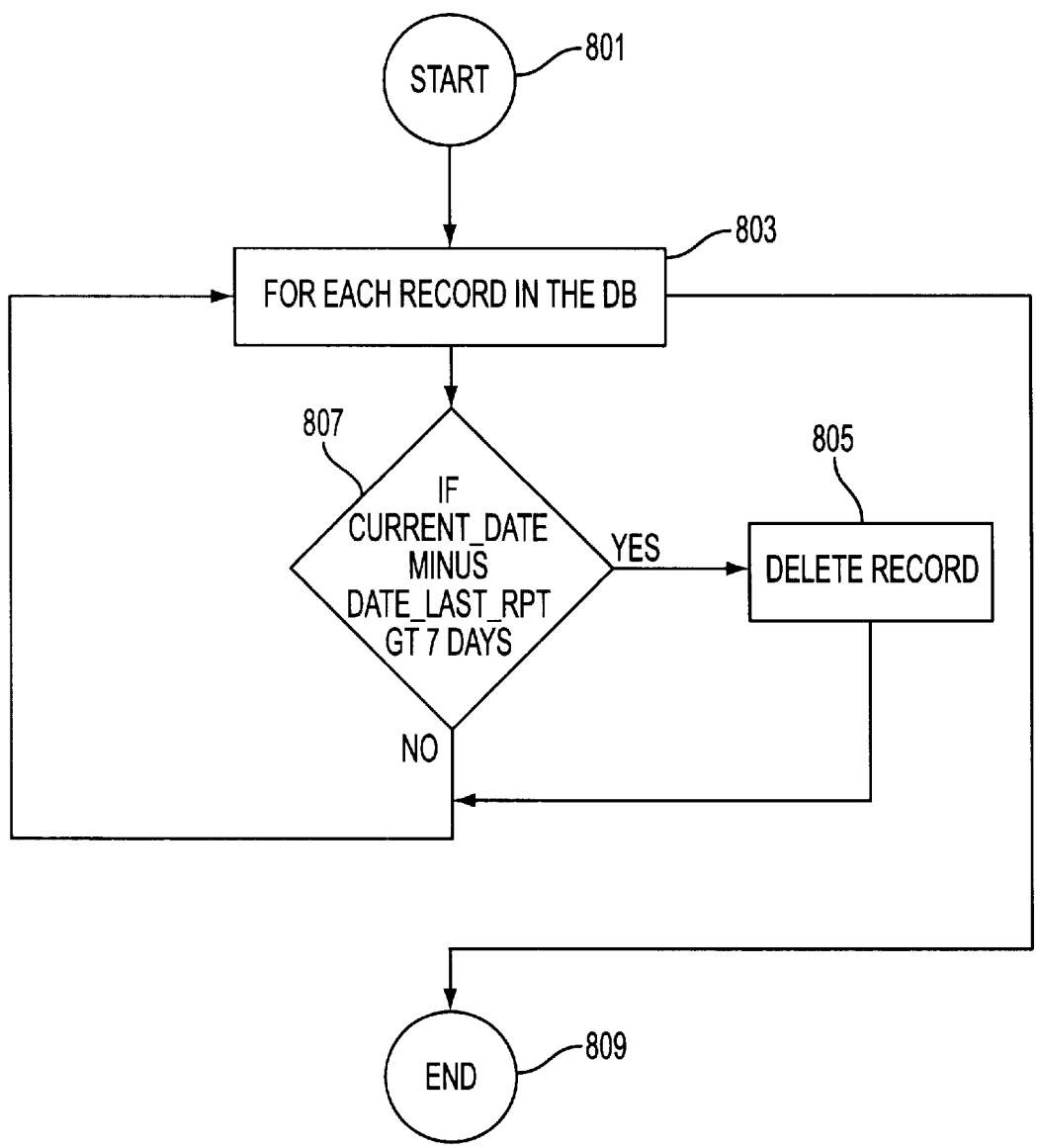

FIGS. 7 and 8 illustrate periodic maintenance processes applied to the Junk e-mail databases. These maintenance processes removes records, that have not been used for a period of time, from the databases thus controlling the size of the databases. These processes are invoked periodically during a period of low computer activity. A preferred embodiment invokes these processes every day at 2:10 a.m.

The process illustrated in FIG. 7 is used to maintain to the User's Junk E-mail database. The process starts at the terminal labeled as 701. Then 703 each record 600 in the database is examined 707 to determine whether the record 600 has been updated within a given trip time. In a preferred embodiment, the trip time is set to seven days. This determination is based on the current date and the date within the "Last Date" field 603 of the record 600 being examined. If the record 600 has been inactive for longer than the trip time, the record 600 is deleted 705. This loop continues for all the records 600 in this database and once the last record is examined the process completes through the terminal labeled as 709.

The process illustrated in FIG. 8 is very similar to the one illustrated in FIG. 7. However, this process maintains the Server's Junk E-mail database. The process starts at the terminal labeled as 801. Then 803 each record 610 in the database is examined 807 to determine whether the record 610 has been updated within some trip time. In a preferred embodiment, the trip time is set to seven days. This determination is based on the current date and the date within the "Date of Last Report" field 615 of the record 610 being examined. If the record 610 has been inactive for longer than the trip time, the record 610 is deleted 805. This loop continues for all the records 610 in this database and once the last record is examined the process exits through the terminal labeled as 809.

One skilled in the art will understand that the trip time value may be specified to best effectuate the goals of the invention. These goals are satisfied when the trip time is set long enough to ensure that delayed junk e-mail messages are captured and discarded.

Junk E-mail Characteristics

As mentioned above, the junk e-mail database records 600, 610 contain a field 601, 611 associated with a set of text strings having attributes that characterize a junk e-mail message. Each set of text strings contains four strings: the first string of the set contains the text string contained in the field-body of the Message-ID: header contained in the junk e-mail—if the junk e-mail did not have a Message-ID: header this string is set to the empty string. The second string of the set contains the text string that identifies the originator of the junk e-mail message. This string is extracted from the field-body of the Sender: header if that header is included in the junk e-mail—if the junk e-mail does not have the Sender: header, the field-body of the From: header is used. If neither the Sender: nor the From: headers are included in the message the second string is also set to the empty string. The third string contains the text of the field-body of the Subject: header or the empty string if no Subject: header was included in the message. Finally, the fourth string contains the concatenation of the first 5 lines of the body text of the message followed by an encrypted digital signature constructed using the user's private key as described below.

Figure 9:
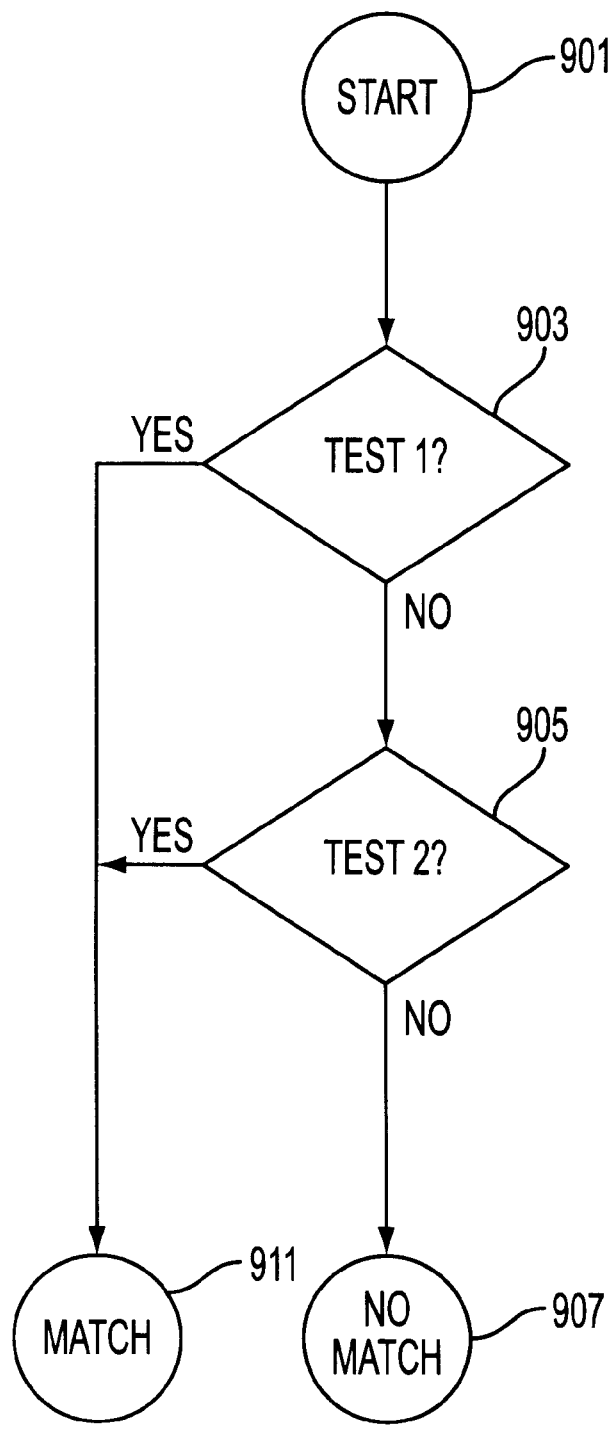
FIG. 9 illustrates the procedure used to compare the characteristics of e-mail messages in accordance with a preferred embodiment.

FIG. 9 illustrates the process used to compare two sets of identifying characteristics or a set of characteristics and an e-mail message. If the comparison is between a set of characteristics and an e-mail message, the process first determines the characteristics of the e-mail message and then performs the same comparisons as between two sets of identifying characteristics. The comparison process for two sets of identifying characteristics starts at the terminal labeled as 901. The first test 903 is whether the Message-ID: strings of both sets of characteristics are the same and not blank. If this condition is true there is a match and the process completes through the terminal labeled as 911. If this condition is false, the second test 905 is whether both Message-ID: fields are empty; the originator and subject data are the same and 80% or more of the words in the first five strings of the body text of each message (these strings are included in the identifying characteristic sets) are the same. Finally, if the characteristics do not match the process terminates through the terminal labeled as 907. Table 1 is a pseudo-code representation of the process illustrated in FIG. 9. One skilled in the art will understand that this pseudo-code is not compilable program code but a textual representation of actual compilable code used to clearly demonstrate the operation of the process illustrated in FIG. 9. The pseudo-code shown in Table 1 is self-documenting to one skilled in the art so long as it is understood that the compare5lines function returns an integer representing the percentage of identical words within the text lines of the two sets of identifying characteristics.

TABLE 1

```
MessageID_type: messageIDA, messageIDB;
boolean match = FALSE;
if ((messageIDA not empty) and (messageIDB not empty)) {
    if (messageIDA equal messageIDB) {match = TRUE};
} elseif ((messageIDA empty) and (messageIDB empty)) {
    if ((messageIDA.send equal messageIDB.sender)
        and (messageIDA.subject equal messageIDB.subject)) {
        if (80 lessthanorequal
            compare5lines(messageIDA.text, messageIDB.text))
            {match = TRUE};
    }
}
```

TABLE 2

Date: Thu, 2 May 1996 12:28:40 -0400
Message-Id: <199605021628.MBA22674@accctmgr>
To: jdoe@sun.com
From: sdilly@sun.com
Subject: The Electric Library
line one
line two
line three the junk mail report message would contain information similar to that shown in Table 3:

TABLE 3

Date: Mon, 20 May 1996 13:49:31 -0700
Message-Id: <199605202049.NAA01356@swptc.Corp.Sun.COM>
To: trusted@sun.com
From: jdoe@sun.com
X-Junk-Mail-Report: <199605201628.MBA22674@accctmgr>
<sdilly@sun.com> <The Electric Library> <line one line two
line three> <-----BEGIN SIGNATURE BLOCK-----
Version: 2.6.2
mQCNAzEB1N8AAAEEANkdxq741DkGjjbHbYRsuiK8u6Cp1cxvOhgHnaF8bWOgb
/zk2Ru9rT2z3zRS3za++OLT/inRqtI5r7Xied4Qn1J8PKypApEuvSgkb2jyi8
OuQW6WsQ72MfPZneP6/4LxcV6jaPtsKXEGiiuvgzUzKoDSBCjvhVurkCy8R4w
RYGJtAAUTtCFCaWxsIEhlcnNoZXkgPCBiaWxsckBnZXRuZXQuY29tID6JAJUD
BRAxAdyfcmUQ3i8LBRUBAbgZA/4owGmQfty3QQd/MMRpqiTqkLvwIJIvK0yW9
uvnQ7/DpWma7z7dEWOJ0kb2V+lqZp0Z/Yr4PdqBcxmU0/D+YfEZYi6eXZfnze
tvT7lHgT2Rfs6q/78kKnZi33uPCDx3+u8o2T8RfW64lmBPOmUM2CT0ZnZu0YW
gz9PPwOROywSGFA===Kzcq
-----END SIGNATURE BLOCK----->

Having described the databases, their maintenance processes and the process used for comparing e-mail identifying characteristics, we now discuss additional aspects of the invention within the receiving e-mail systems.

Classifying E-mail as Junk E-Mail

Figure 10:
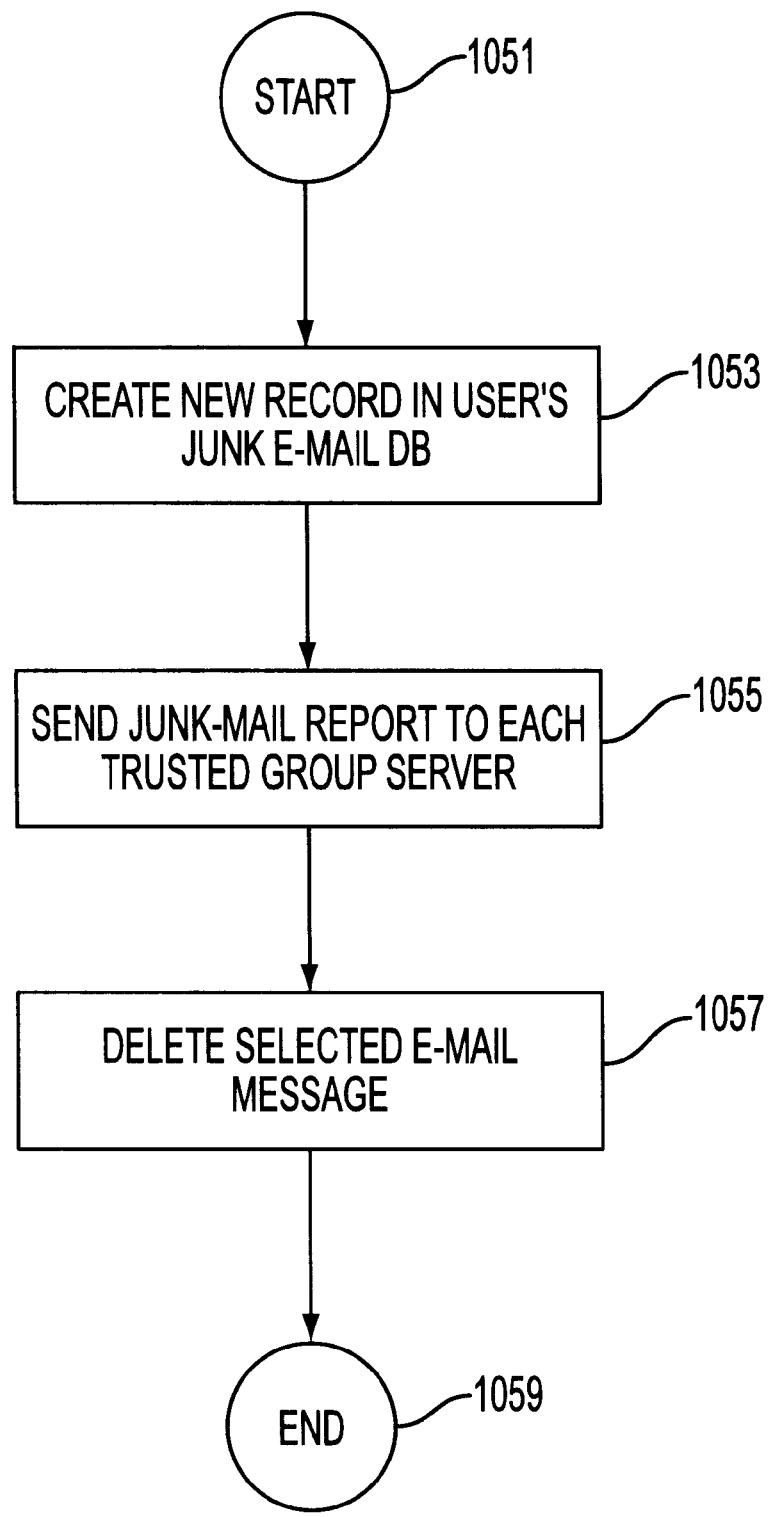
FIG. 10 illustrates the process used to process an e-mail message that is classified as a junk e-mail message by a user in accordance with a preferred embodiment.

FIG. 10 illustrates the process a trusted user invokes upon designating an e-mail message to be junk e-mail. As described above in the discussion of FIG. 4b, once a trusted user views a given message that user has a number of options to dispose of the displayed message. These options include the option to "delete" 427 the displayed message or "delete as junk mail" 425 the displayed message. When the recipient selects the "delete as junk mail" option 425 the process illustrated in FIG. 10 is invoked. The process starts at the terminal labeled as 1051. The process then 1053 creates a new record 600 in the recipient's version of the User's Junk E-mail database. To create this record 600, the process first examines the displayed e-mail message to extract a set of identifying characteristics for that message. This set of characteristics is stored in the "Junk E-mail Characteristics" field 601 of the record 600. Additionally, the current date is placed in the "Last Date" field 603. Next 1055, the process constructs a Junk-Mail Report message addressed to each Trusted Group Server in the User's Trusted Group database. This message is an e-mail message that includes an X-Junk-Mail-Report: header. The field-body of this header includes the identifying characteristics of the message being reported. Thus, if the displayed message contained the information shown in Table 2:

Each field in the header-body of the X-Junk-Mail -Report: header is delimited by a "<" and ">" pair with a convention that if the character ">" is included in the delimited data it is replaced by ">>" to indicate that the ">" is part of the data and not a delimiter.

Additionally authentication information in the form of a digital signature (a large binary number encoded into ASCII text using methods well understood in the art) is added to this message as described below. This message is sent to each Trusted Group Server existing in the User's Trusted Group database by retrieving database records 500 and for each record 500, constructing the authentication information using the information in the "Trusted Group Server Public Key" field 505 and sending the message to the e-mail address associated with the "E-mail Address of Trusted Group Server" field 503. Thus, each Trusted Group Server is notified that the recipient has classified the e-mail as junk e-mail. Finally 1057, the displayed message is deleted from the user's mail system and the process completes through the terminal labeled as 1059.

As will be described below, the creation of a record 600 in the User's Junk E-mail database means that additional copies of the message that the recipient has classified as junk e-mail will be discarded when they are received. One skilled in the art will understand that the invention need not create this record 600 at this time because the Trusted Group Server may eventually send a Junk Mail Warning message to the recipient's mail system that will create the record 600 and cause subsequent messages to be discarded. In this circumstance, the recipient's classification of the displayed message a junk e-mail is simply an advisory to the Trusted Group Server. Further, one skilled in the art will understand that the detailed structure of the example above does not limit the invention and that the invention can operate with many different message formats.

Trusted Group Server

The Trusted Group Server receives junk mail report messages from trusted users and accumulates these messages until it receives some number of junk mail report messages relating to a particular putative junk mail message. After receiving a sufficient number of junk mail report messages relating to the particular putative junk mail message the Trusted Group Server sends a junk mail warning message to one or more trusted group members. This junk mail warning message conditions the trusted user's e-mail system to dispose of the putative junk mail message before it is viewed by the trusted user.

Figure 11A:
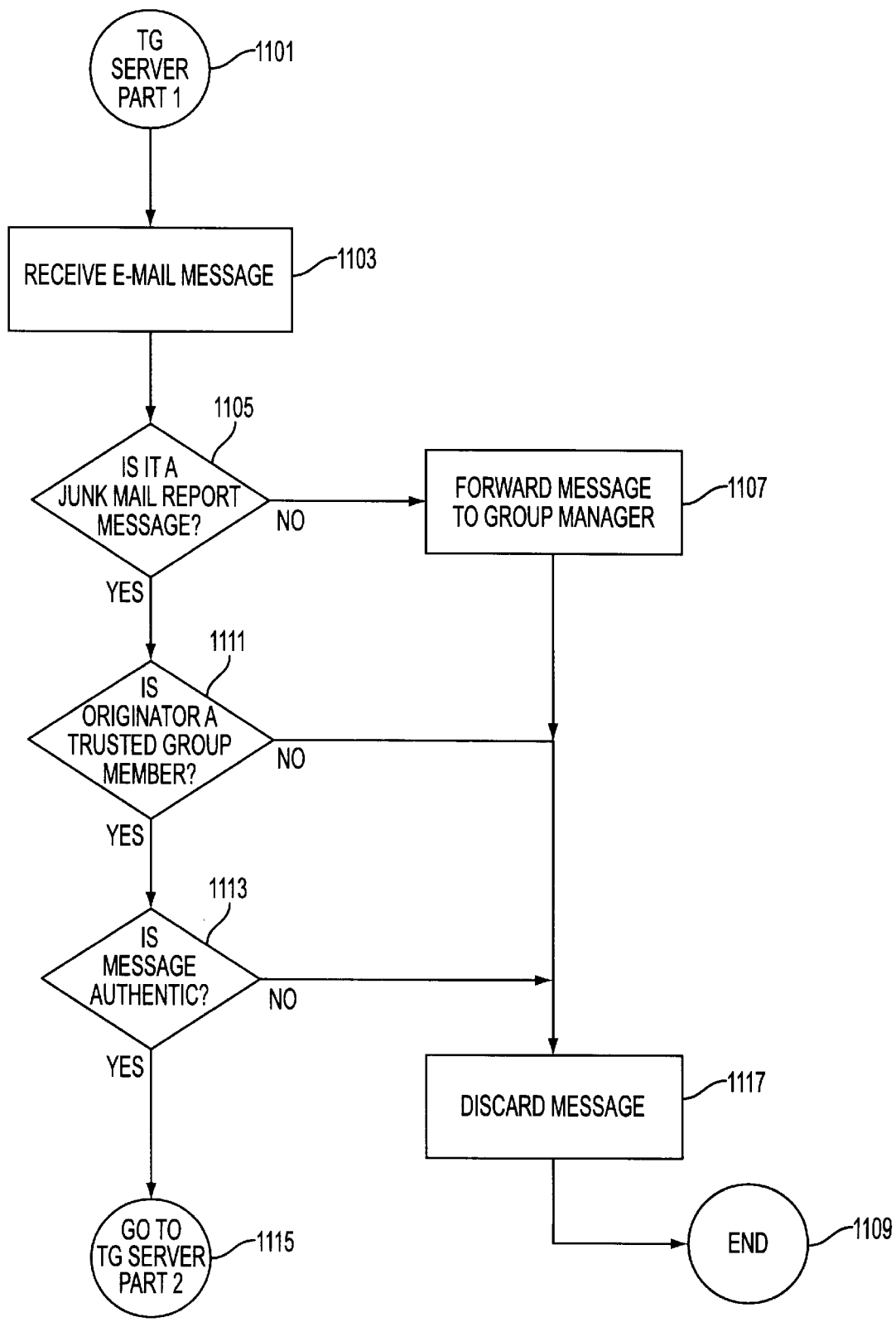
FIGS. 11a&b illustrate the process used by a Trusted Group Server to process junk e-mail report messages in accordance with a preferred embodiment.

FIG. 11a illustrates the process used by the Trusted Group Server when it receives an e-mail message. The process starts at the terminal labeled as 1101. The server receives 1103 an e-mail message and examines the received message to determine 1105 whether the received message is a Junk Mail Report message as indicated by the presence of the X-Junk-Mail-Report: header in the received message. At this time, a copy of the received message is placed in a log file to provide a history of received messages for security purposes. If the log file becomes too large the message is not stored, instead a copy of the message is forwarded to the group manager along with a warning message stating that the log file has overflowed. If 1105 the received message is not a Junk Mail Report message, the process forwards 1107 the received message to e-mail address of the group manager, deletes 1117 the received message from the server system (leaving the copy in the log file) and completes through the terminal labeled as 1109. The group manager is responsible for the maintenance of the Trusted Group Server and will process or dispose of the forwarded received message as appropriate.

If 1105 the received message is a Junk Mail Report message, the process then checks 1111 whether the originator of the received message is a member of the trusted group by comparing the field-body text of the Sender: header field with the records 510 in the Server's Trusted Group database to determine whether the originator's e-mail address is contained in the "E-mail Address of Trusted Group Member" field 511 of one of the records 510 in the database—if the received message does not include a Sender: field, the information i n the field-body of the From: header is used. If no record 510 exists matching the originator's e-mail address, the received message is discarded 1117 and the process competes through the terminal labeled as 1109.

If 1111 the originator of the received message is a member of the trusted group, the next step 1113 determines whether the received message is authentic. This check occurs by decrypting the digital signature contained in the received message characteristic set using methods well understood in the art. If the digital signature cannot be authenticated, the received message is discarded 1117 and the process competes through the terminal labeled as 1109.

Figure 11B:
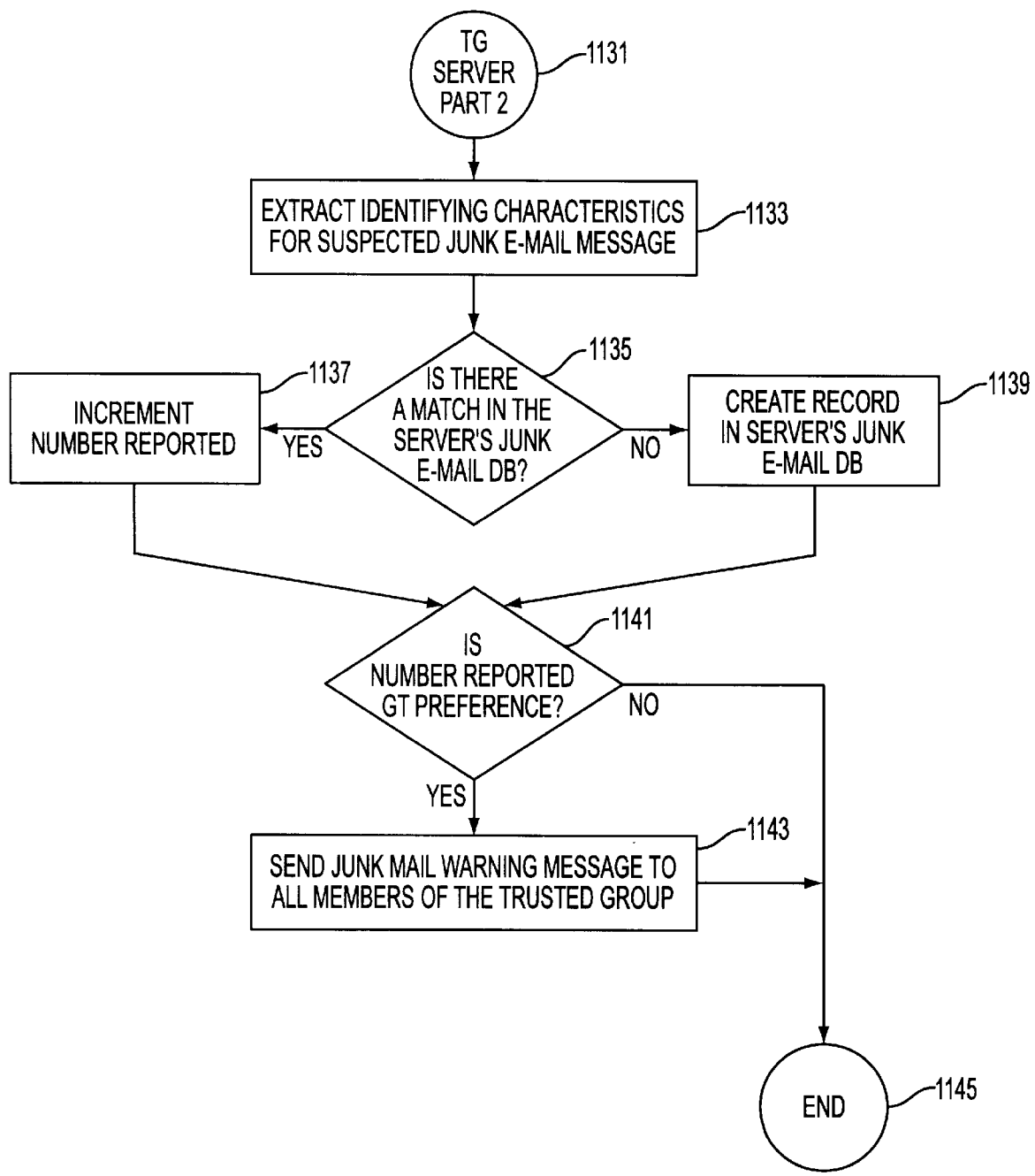

If 1113 the message is authentic, the process continues through the terminal labeled as 1115 to the terminal labeled as 1131 of FIG. 11b. Next 1133, the process extracts the identifying characteristics of the reported junk e-mail message and determines 1135 whether the Server's Junk E-mail database contains a record 610 with matching characteristics in the "Junk E-mail Characteristics" field 611. At this point, the received message is deleted after retaining any needed information. If 1135 such a record 610 exists, the value in the "Number of Trusted Group Reporting" field 613 is incremented 1137 and the current date is stored in the "Date of Last Report" field 615. Storing the current date in the record 610 resets this record's trip time as used in the process described for FIG. 8. The process continues to the decision block labeled as 1141 and described below. If 1135 no record 610 matches the report's characteristics, the process creates 1139 a new record 610 in the Server's Junk E-mail database storing the characteristics of the message in the "Junk E-mail Characteristics" field 611, setting the "Number of Trusted Group Reporting" field 613 to a value of "1" and setting the "Date of Last Report" field 615 to the current date. Next 1141, the process checks whether the value contained in the "Number of Trusted Group Reporting" field 613 is greater than a preference value—if "Number of Trusted Group Reporting" field 613 is not greater than the preference value, the process completes through the terminal labeled as 1145.

If the value in the "Number of Trusted Group Reporting" field 613 is greater than the preference value, the process constructs 1143 and sends a Junk Mail Warning message to the members of the trusted group and the process completes through the terminal labeled as 1145. One skilled in the art will understand that the process described above contemplates sending junk e-mail warning messages to selected members of the trusted group.

The junk e-mail warning message contains an X-Junk-Mail-Warning: header with a field-body containing the e-mail message characteristics and digital signature of the Trusted Group Server in a format similar to the one described above for the Junk Mail Report message.

Trusted User's Mail System

Figure 12A:
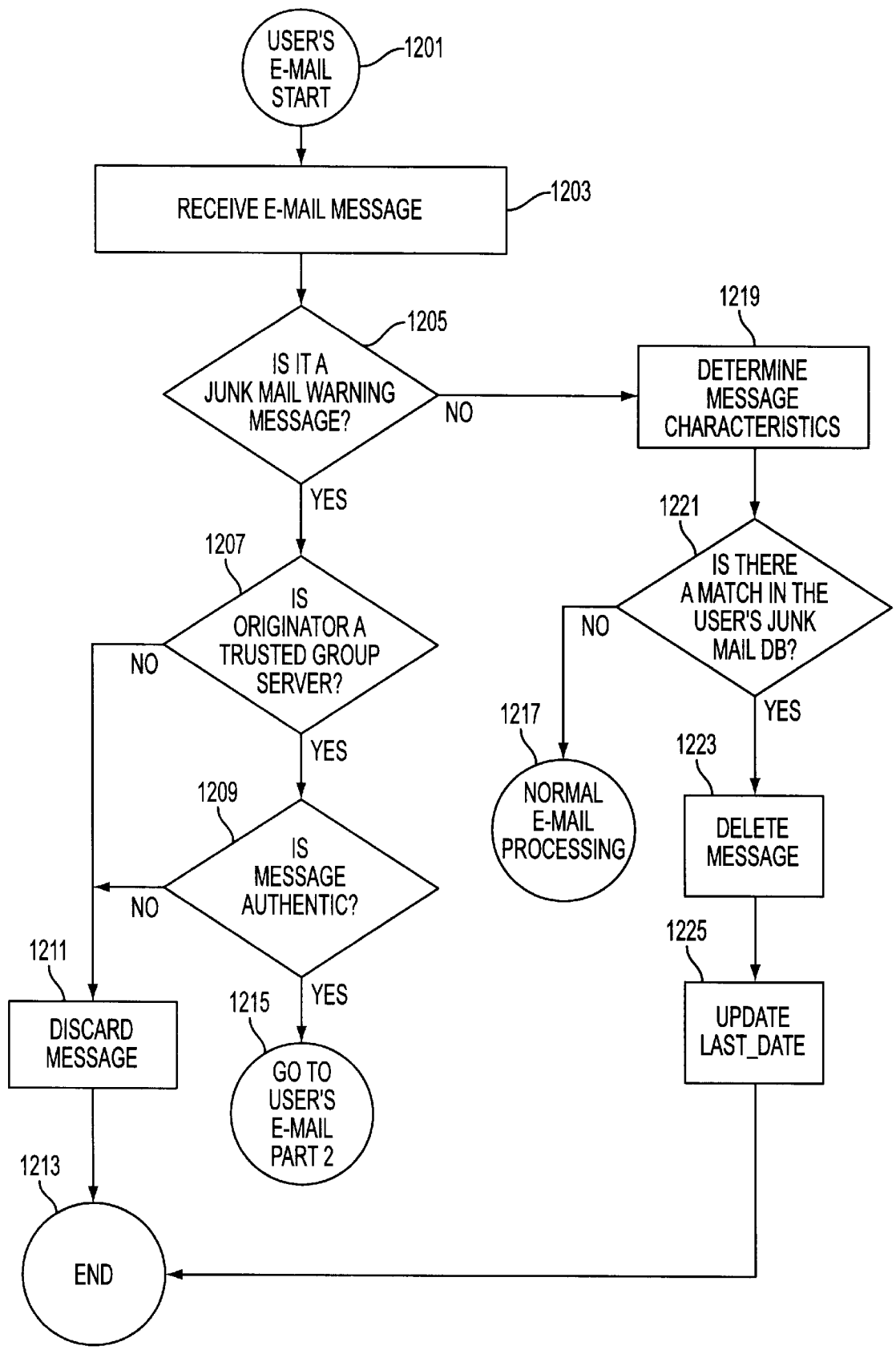
FIGS. 12a&b illustrate the process used to by a trusted user's mail system to detect and discard junk e-mail messages in accordance with a preferred embodiment.

FIG. 12a illustrates the process used by a trusted user's e-mail system utilizing a preferred embodiment of the invention. The process starts at the terminal labeled as 1201. Once the trusted user's e-mail system receives 1203 a new e-mail message, the e-mail system determines 1205 whether the message is a Junk Mail Warning message by examining the message for a X-Junk-Mail-Warning: header. If 1205 the new e-mail message is a Junk Mail Warning message, it is checked 1207 to determine whether the originator of the message is a Trusted Group Server. This determination is accomplished by examining the User's Trusted Group database for a record 500 that contains the same e-mail address in the "E-mail Address of Trusted Group Server" field 503 as the e-mail address of the new message's originator.

If 1207 the new message is not from a Trusted Group Server the new message is discarded 1211 and the process completes through the terminal labeled as 1213. If 1207 the new message is from a trusted server, the digital signature is authenticated as described below. If 1209 the digital signature is not authentic the new message is discarded 1211 and the process completes through the terminal labeled as 1213. If 1209 the new message is authentic the process continues through the terminal labeled as 1215 to the terminal labeled as 1251 in FIG. 12b.

However, if 1205 the new message is not a Junk Mail Warning message, the process then determines 1219 the message's characteristics. Once the new message's characteristics are obtained the process checks whether 1221 a record 600 exists in the User's Junk E-mail database that matches the new message's characteristics—if 1221 no match exists, the process continues with normal e-mail processing through the terminal labeled as 1217 and inventive aspects of the process complete.

However, if 1221 the characteristics of the new message do match the "Junk E-mail Characteristics" field 601 of a record 600, the new message has been determined to be a junk e-mail message and the new message is deleted 1223 and is thus prevented from being presented to the recipient. Thus, the invention has intercepted and disposed of the junk e-mail. Finally, the matching record 600 is updated 1225 by storing the current date in the "Last Date" field 603 of the matching record 600 and the process completes through the terminal labeled as 1213.

Figure 12B:
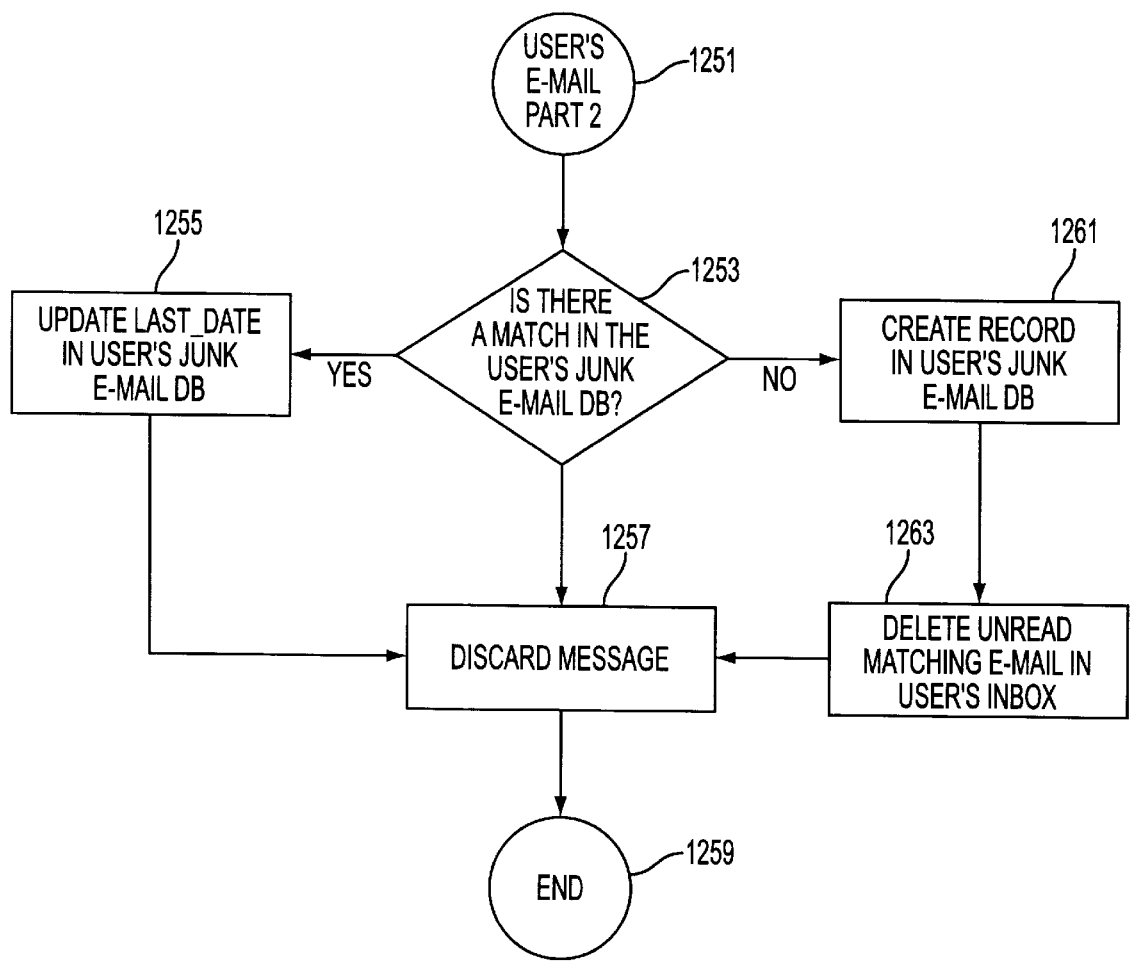

FIG. 12b illustrates the process that continues from the terminal labeled as 1215 in FIG. 12a. Processing continues from the terminal labeled as 1251. At this point, the process has received a Junk Mail Warning message, has verified that this message originated from a Trusted Group Server and has authenticated the digital signature of the Trusted Group Server. Now, the process checks whether 1253 the User's Junk E-mail database already contains a record 600 having the same characteristics as that included in the new Junk Mail Warning message—if 1253 such a record 600 exists, the current date is stored 1255 in the "Last Date" field 603 of the record 600. Thus, resetting this record's 600 trip time used in the process described in FIG. 7.

Finally, the new Junk Mail Warning message is discarded 1257 and the process completes through the terminal labeled as 1259. If 1253 no record 600 exists in the User's Junk E-mail database, the process creates 1261 such a record 600 and initializes its fields. The "Junk E-mail Characteristics" field 601 is initialized with the set of characteristics provided in the field-body portion of the X-Junk-Mail-Warning: header. The "Last Date" field 603 is initialized with the current date. Finally, the inbox is scanned. This scan process examines each unread e-mail message in the user's inbox, characterizes the unread e-mail message, and if the characterization matches that included in the new Junk Mail Warning message the unviewed message is deleted 1263 from the inbox so that it will not be presented to the recipient, the Junk Mail Warning message is discarded 1257, and the process completes through the terminal labeled as 1259.

Authentication

Authentication is the process used by a recipient to be confident of the identity of the originator. The technology is well understood by those skilled in the art. First a message digest is created by passing the message through a hash function (such as MD4 or MD5). Then, this digest is encrypted using the senders private key resulting in a signature.

This signature is a large binary number that is converted to an ASCII representation as shown in Table 3. The recipient first converts the ASCII representation back to a number and decrypts the message digest using the senders public key. Then the recipient creates another message digest of the originator's message and compares the newly created digest with the decrypted version. If the two digests are the same the message is authentic.

In the instant invention, the message header information (not including the signature block field of in the field-body of the X-Junk-Mail-Report: header) is used as the input to the hash function.

Conclusion

One skilled in the art will understand that the invention as described above teaches a computerized e-mail system that provides a group of like trusted minded recipients to collectively determine which e-mail messages are junk e-mail for that group. Further, the invention removes these junk e-mail messages and thus removes that burden from most of the group.

Further, one skilled in the art will understand that various modifications and alterations may be made in the preferred embodiment disclosed herein without departing from the scope of the invention. Accordingly, the scope of the invention is not to be limited to the particular invention embodiments discussed above, but should be defined only by the claims set forth below and equivalents thereof.

What is claimed is:

1. A computer controlled method for processing electronic mail (e-mail) comprising the steps of:
    (a) automatically presenting an e-mail message to a first trusted recipient; said first trusted recipient being one of a plurality of trusted recipients;
    (b) classifying said e-mail message as junk e-mail; and
    (c) when said e-mail is classified as junk e-mail, automatically preventing presentation of said e-mail message to one or more of said plurality of trusted recipients.

2. The computer controlled method of claim 1 wherein said plurality of trusted recipients are known to a trusted group server and wherein said computer controlled method of claim 1 further comprises
    (b1) automatically notifying said trusted group server that said first trusted recipient has classified said e-mail message as junk e-mail.

3. The computer controlled method of claim 2 wherein step (b1) further comprises sending a junk mail report message to said trusted group server.

4. The computer controlled method of claim 3 wherein said junk mail report message includes an x-junk-mail-report header.

5. The computer controlled method of claim 3 wherein said junk mail report message further includes an identifying characteristic of said e-mail message.

6. The computer controlled method of claim 1 wherein step (c) further comprises:
    (c3) sending a junk mail warning message to said plurality of trusted recipients.

7. The computer controlled method of claim 6 wherein step (c) further comprises:
    (c1) receiving a junk mail report message; and
    (c2) initiating step c3 after receiving said junk mail report message.

8. The computer controlled method of claim 6 wherein said junk mail warning message includes an x-junk-mail-warning header.

9. The computer controlled method of claim 1 wherein step (c) further comprises:
    (c1) receiving a junk mail warning message.

10. The computer controlled method of claim 9 wherein said junk mail warning message includes an identifying characteristic of said e-mail message and whereby step (c) further comprises:
    (c4) deleting an unfermented e-mail message having said identifying characteristic.

11. The computer controlled method of claim 10 wherein step (c) further comprises:
    (c2) storing said identifying characteristic; and
    (c3) receiving said unfermented e-mail message.

12. An electronic mail (e-mail) system having a central processing unit (CPU), a memory, and a file storage mechanism; said system comprising:
    a presentation mechanism configured to present an e-mail message to a first trusted recipient; said first trusted recipient being one of a plurality of trusted recipients;
    a classification mechanism configured to allow said first trusted recipient to classify said e-mail message as junk e-mail; and
    a presentation prevention mechanism configured to selectively prevent presentation of said e-mail message to one or more of said plurality of trusted recipients.

13. The electronic mail system of claim 12 wherein said plurality of trusted recipients are known to a trusted group server and wherein the electronic mail system of claim 12 further comprises:

a notification mechanism configured to notify said trusted group server that said first trusted recipient has classified said e-mail message as junk e-mail.

14. The electronic mail system of claim 13 wherein said notification mechanism is further configured to send a junk mail report message to said trusted group server.

15. The electronic mail system of claim 14 wherein said junk mail report message includes an x-junk-mail-report header.

16. The electronic mail system of claim 14 wherein said junk mail report message includes an identifying characteristic of said e-mail message.

17. The electronic mail system of claim 12 wherein said presentation prevention mechanism further comprises a warning mechanism configured to send a junk mail warning message to one or more of said plurality of trusted recipients.

18. The electronic mail system of claim 17 wherein said presentation prevention mechanism further comprises:

a reception mechanism configured to receive a junk mail report message; and an initiation mechanism configured to initiate said warning mechanism after receiving said junk mail report message.

19. The electronic mail system of claim 17 wherein said junk mail warning message includes an x-junk-mail-warning header.

20. The electronic mail system of claim 12 wherein said presentation prevention mechanism further comprises a first reception mechanism configured to receive a junk mail warning message.

21. The electronic mail system of claim 20 wherein said junk mail warning message includes an identifying characteristic and whereby said presentation prevention mechanism further comprises a deletion mechanism configured to dispose of an unfermented e-mail message having said identifying characteristic.

22. The electronic mail system of claim 21 wherein said presentation prevention mechanism further comprises:

a storage mechanism configured to store said identifying characteristic; and a second reception mechanism configured to receive said unfermented e-mail message.

23. An electronic mail (e-mail) apparatus configured to process electronic mail messages; and apparatus having a central processing unit (CPU), a memory, and a file storage mechanism; said apparatus comprising:

a presentation prevention mechanism configured to prevent presentation of an e-mail message to one or more of a plurality of trusted recipients, and including a junk mail reporting mechanism configured to send a junk mail report message to a trusted group server.

24. The electronic mail apparatus of claim 23 wherein said presentation prevention mechanism further comprises a junk mail warning message reception mechanism configured to receive a junk mail warning message from said trusted group server.

25. The electronic mail apparatus of claim 24 wherein said junk mail warning message includes an identifying characteristic of said e-mail message and said presentation prevention mechanism further comprises a junk mail deletion mechanism configured to dispose of said e-mail message.

26. The electronic mail apparatus of claim 25 wherein said junk mail deletion mechanism further comprises a junk mail intercept mechanism configured to dispose of said e-mail message prior to said e-mail message being stored in an inbox.

27. The electronic mail apparatus of claim 25 wherein said junk mail deletion mechanism further comprises a junk mail removal mechanism configured to scan an inbox to dispose of said e-mail message.

28. A trusted group server apparatus configured to process electronic mail messages; said apparatus having a central processing unit (CPU), a memory, and a file storage mechanism; said apparatus comprising:

a notification reception mechanism configured to receive a junk mail report message containing information about an e-mail message classified as junk e-mail by a trusted group recipient served by said trusted group server apparatus; and a warning mechanism configured to send a junk mail warning message to a trusted group recipient.

29. The trusted group server apparatus of claim 28 further comprising an initiation mechanism configured to initiate said warning mechanism after receipt of said junk mail report message.

30. A computer program product comprising:

(a) a computer usable storage medium; and (b) computer controlling instructions, stored on said storage medium providing presentation prevention mechanism configured to prevent presentation of an email message to one or more of a plurality of trusted recipients, said presentation prevention mechanism including a junk mail reporting mechanism configured to send a junk mail report message to a trusted group server.

31. The computer program product of claim 30 wherein said presentation prevention mechanism further comprises a junk mail warning message reception mechanism configured to receive a junk mail warning message.

32. The computer program product of claim 31 wherein said junk mail warning message includes an identifying characteristic of said e-mail message, and said presentation prevention mechanism further comprises a junk mail deletion mechanism configured to dispose of said e-mail message.

33. The computer program product of claim 32 wherein said junk mail deletion mechanism further comprises a junk mail intercept mechanism configured to dispose of said e-mail message prior to said e-mail message being stored in an inbox.

34. The computer program product of claim 33 wherein said junk mail deletion mechanism further comprises a junk mail removal mechanism configured to scan an inbox to dispose of said e-mail message.

35. A computer program product comprising:

(a) a computer usable storage medium; and (b) computer controlling instructions stored on said storage medium, providing notification reception mechanism configured to receive a junk mail report message; and (c) computer controlling instructions, stored on said storage medium, providing a warning mechanism configured to send a junk mail warning message to a trusted group recipient served by said computer.

36. The computer program product of claim 35 further comprising computer controlling instructions stored on said storage medium providing an initiation mechanism configured to initiate said warning mechanism after receipt of said junk mail report message.

\* \* \* \* \*